United States Patent Office 2,819,236
Patented Jan. 7, 1958

2,819,236

LOW DUROMETER SILOXANE ELASTOMERS

Norbert G. Dickmann, Midland, Mich., assignor to Dow Corning Corporation, Midland, Mich., a corporation of Michigan No Drawing. Application December 23, 1954
Serial No. 477,408

6 Claims. (Cl. 260—29.1)

This invention relates to novel organopolysiloxane elastomers.

In the siloxane elastomer art there is a great need for low durometer elastomers, that is elastomers having a durometer of 30 or less. Heretofore the only practicable material which would meet this requirement was a sponged siloxane elastomer. Whereas sponged elastomers are suitable for many uses, the fabrication of such a material particularly when the article is extruded is extremely difficult. This is due to the fact that the sponging process gives extrusions of varying cross section. For example, if a part is to be extruded with a cross section of ½″ parts may be ¾″ and other parts of the extrusion may be ⅜″. This is due to the fact that it is quite difficult to control the cross sectional area during the sponging process. As a result, during the fabrication of extruded sponged siloxane elastomeric articles there is always an extremely high proportion of rejects. Inasmuch as the sponging process also vulcanizes the elastomer these rejects are useless and cannot be put back through the extruder. Consequently a considerable economic loss is involved, thereby greatly increasing the price of sponged articles.

It has been known that low durometer siloxane elastomers can be obtained by incorporating low polymer dimethyl fluids in the elastomer prior to vulcanization. However, when this is done the resulting compounded material is quite sticky and very difficult to handle. As a result the compounded rubber adheres to the rolls of the mill and to the equipment in which it is compounded and also to the sides of molds and extruders thereby causing imperfect parts. As a result this previously known process is not commercially feasible due to the extreme difficulty of fabrication of the sticky material.

It is the object of this invention to avoid both of the above difficulties by producing a siloxane elastomer which gives low durometer after vulcanization and which can be handled and extruded with a maximum of efficiency. Another object of this invention is to produce a low durometer siloxane elastomer which has a maximum of tensile strength, elongation, and tear resistance and a minimum compression set. Another object is to improve the electrical properties of siloxane elastomers. Other objects and advantages will be apparent from the following description.

This invention relates to a heat hardenable composition comprising (1) 100 parts by weight of a diorganopolysiloxane gum in which the organic radicals are monovalent hydrocarbon or halogenated monovalent hydrocarbon radicals, (2) 10 to 35 parts by weight of a copolymer fluid having a viscosity of less than 1,000,000 cs. at 25° C. and being composed of from 20 to 60 mol percent dimethylsiloxane, 30 to 60 mol percent phenylmethylsiloxane, from 5 to 15 mol percent siloxane units of the formula $$R_n ViSiO_{\frac{3-n}{2}}$$

in which R is alkyl or phenyl and $n$ has a value from 0 to 1 inclusive and from .0003 to 35 mol percent siloxane units of the formula $RMe_2SiO_{.5}$ in which R is alkyl or phenyl at least some of the vinylsiloxane being copolymerized with the phenylmethylsiloxane and (3) a peroxide vulcanization agent.

The critical ingredient of the compositions of this invention is the fluid 2. This fluid can be either a copolymer of all four of the above defined ingredients or it can be a mixture of copolymers which mixture contains all four of the above defined ingredients. When the mixtures are employed there must be some of the vinylsiloxane copolymerized with the phenylmethylsiloxane. It is not necessary that there be any vinylsiloxane copolymerized with the dimethylsiloxane. Thus, the fluids of this invention may be a copolymer of dimethylsiloxane, phenylmethylsiloxane, one or more of the defined vinylsiloxanes and one or more of the defined triorganosiloxanes. Alternatively the fluid may be a mixture of a copolymer of dimethylsiloxane and one or more of the defined triorganosiloxanes and a copolymer of phenylmethylsiloxane, one or more of the defined vinylsiloxanes and one or more of the defined triorganosiloxanes. Again the fluid may be a mixture of copolymers of dimethylsiloxane, one or more of the defined vinylsiloxanes and one or more of the defined triorganosiloxanes and a copolymer of phenylmethylsiloxane, one or more of the defined vinylsiloxanes and one or more of the defined triorganosiloxanes.

In all cases, whether the fluid is employed as a single copolymer or a mixture of two or more copolymers, the above defined mol ratios must obtain. Furthermore, the fluid, whether it be a single copolymer or a mixture of copolymers, must be employed in amount from 10 to 35 parts by weight total based on 100 parts by weight of the gum (1).

Each of the above four ingredients in fluid 2 is critical and the ratios thereof are critical. If the dimethylpolysiloxane is not employed within the specified proportions the resulting compounded material will be too dry to be milled and fabricated successfully. If the phenylmethylsiloxane is omitted the resulting compounded material will be too sticky to be successfully compounded. If the vinylsiloxane is omitted the fluid will bleed from the elastomer during cure with a resulting rise in durometer. If the triorganosiloxane is omitted a low durometer is not obtained in the cured elastomers.

For the purposes of this invention the vinylsiloxane can be in the form of monovinylsiloxane, phenylvinylsiloxane or an alkylvinylsiloxane such as methylvinylsiloxane, ethylvinylsiloxane, or octadecylvinylsiloxane. Preferably the R group should be methyl or phenyl. The triorganosiloxane employed in the fluid can be trimethylsiloxane, dimethylphenylsiloxane or a dimethyl higher alkyl siloxane such as dimethylethylsiloxane, dimethylbutylsiloxane and the like. Preferably the end-blocking material should be trimethylsiloxane or phenyldimethylsiloxane.

Diorganopolysiloxane gum (1) is an extremely high viscosity material having a viscosity upwards of 10,000,000 cs. The gums may be soluble or insoluble in hydrocarbon solvents such as benzene. The organic groups attached to the silicon in the gum may be any monovalent hydrocarbon radical such as ethyl, butyl, vinyl, cyclohexyl, tolyl, benzyl, xenyl, or octadecyl and any halogenated monovalent hydrocarbon radical such as chlorophenyl, trifluorovinyl, tetrafluoroethyl, α,α,α-trifluorotolyl or bromoxenyl. Preferably from the standpoint of thermal stability a majority of the radicals should be phenyl, methyl or fluorinated hydrocarbon radicals with or without a small amount of higher alkyl and/or alkenyl radicals, such as ethyl, vinyl, propyl, allyl and the like.

The vulcanizing agents employed in the compositions of this invention are the well known organic peroxide vulcanization agents. Any peroxide vulcanizing agent may be employed but the preferred agents are aromatic acyl peroxides such as benzoyl peroxide, tertiary butyl perbenzoate, dichlorobenzoyl peroxide and monochlorobenzoyl peroxide. In general these peroxides are employed in amount from .5 to 3 parts by weight based upon the weight of the gum.

If desired, fillers may be incorporated in the elastomers of this invention in order to improve physical properties. Any of the fillers commonly employed with siloxane elastomers can be used. Typical fillers include metal oxides such as titania, zinc oxide, ferric oxide and the like and silica fillers such as diatomaceous earth, crushed quartz, and silica aerogels. The preferred fillers are the extremely finely divided silicas such as fume silicas and silica aerogels. If desired the fillers may be treated with chlorosilanes or other hydrolyzable silanes.

The compositions of this invention may be compounded and vulcanized in the conventional manner for handling siloxane elastomers. It has been found advantageous to compound the gum, the fluid and if desired, a filler and then give a preliminary heating for a few hours at 150–250° C. Thereafter the vulcanizing agent is incorporated in the mix and the elastomer is vulcanized in the usual manner. Suitable vulcanization temperatures range from 110–150° C. or above. It is often advantageous to after-cure the elastomer a few hours at 150–250° C.

The elastomers may contain other additives which are normally employed in siloxane elastomers to improve specific properties such as compression set or oxidation resistance or to impart the desired color to the rubber.

The elastomers of this invention are particularly useful for sealing purposes which require a combination of low durometer, high stress-strain properties and reasonably low compression set. They are also quite useful in electrical insulation since it has been found most unexpectedly the incorporation of the fluids of this invention gives lower dielectric constant and a lower power factor than is found in conventional siloxane elastomers.

The following examples are illustrative only and should not be construed as limiting the invention which is properly delineated in the appended claims. The compression sets shown below were determined in accordance with ASTM test D–395–49–T except that the samples were compressed for 22 hours at 150° C.

*Example 1*

The ingredients employed to make the elastomer of this invention were as follows:

100 parts by weight of a benzene soluble methylphenylpolysiloxane gum, 15 parts by weight of a copolymeric fluid having a viscosity of 123 cs. at 25° C. and having a composition of 6 mol percent methylvinylsiloxane, 12 mol percent trimethylsiloxane, 52 mol percent phenylmethylsiloxane and 30 mol percent dimethylsiloxane, 35 parts by weight of a fume silica, and .8 part by weight of dichlorobenzoyl peroxide.

The gum, fluid and silica were mixed on a mill until a uniform mix was obtained and the resulting material was heated three hours at 250° C. The peroxide was then milled into the material and the resulting mix was heated in a mold 5 minutes at 126° C. and thereafter cured for 24 hours at 250° C. The resulting elastomers had the following properties:

| Cure | Tensile strength in p. s. i. | Percent Elongation at break | Durometer | Percent Compression set |
|---|---|---|---|---|
| 5 min. at 126° C | 840 | 860 | 20 | |
| 24 hrs. at 250° C | 510 | 580 | 23 | 39 |

*Example 2*

The ingredients employed to make the elastomer of this example were as follows: 100 parts of a benzene soluble copolymeric siloxane gum having the composition 92.36 mol percent dimethylsiloxane, .14 mol percent methylvinylsiloxane and 7.5 mol percent phenylmethylsiloxane, 25 parts by weight of a copolymer fluid having a viscosity of 106 cs. at 25° C. and being composed of 67 mol percent dimethylsiloxane, 9 mol percent methylvinylsiloxane, 36 mol percent phenylmethylsiloxane and 8 mol percent trimethylsiloxane, 35 parts by weight of a fume silica, and 2.4 parts by weight dichlorobenzoyl peroxide.

These materials were compounded and vulcanized as in Example 1 except that the after-cure was for one hour at 150° C. The resulting elastomer had the following properties:

| Cure | Tensile strength in p. s. i. | Percent Elongation at break | Durometer | Tear resistance in lbs. per in. | Percent Compression set |
|---|---|---|---|---|---|
| 5 min. at 126° C | 680 | 460 | 24 | 98 | |
| 1 hr. at 150° C | 755 | 450 | 25 | 96 | 45 |

The compounded material prior to vulcanization showed excellent handling properties both with respect to extrusion and calendering operations.

*Example 3*

The ingredients employed to make the elastomer of this invention were as follows:

100 parts by weight of the siloxane gum of Example 2, 20 parts by weight of a copolymer fluid having a viscosity of 111 cs. at 25° C. and having the composition 28 mol percent dimethylsiloxane, 10 mol percent methylvinylsiloxane, 50 mol percent phenylmethylsiloxane and 12 mol percent trimethylsiloxane, 5 parts by weight of a copolymer fluid having a viscosity of 658 cs. and composition of 89 mol percent dimethylsiloxane, 10 mol percent methylvinylsiloxane and 1 mol percent trimethylsiloxane, 35 parts by weight of a fume silica, and 2.4 parts by weight of dichlorobenzoyl peroxide.

This material was milled and fabricated in an identical manner with that of Example 2 and the resulting elastomer had the following properties:

| Cure | Tensile strength in p. s. i. | Percent Elongation at break | Durometer | Tear resistance in lbs. per in. |
|---|---|---|---|---|
| 5 min. at 126° C | 673 | 610 | 23 | 117 |
| 1 hr. at 150° C | 750 | 638 | 23 | 115 |

*Example 4*

Equivalent results are obtained when the following peroxides are employed in the procedure of Example 2. Benzoyl peroxide, monochlorobenzoyl peroxide and tertiary butyl perbenzoate. In the latter case the vulcanization is carried out for 15 minutes at 150° C.

*Example 5*

Equivalent results are obtained when phenylvinylsiloxane is substituted for the methylvinylsiloxane in the copolymer fluid of Example 1 and when monovinylsiloxane is substituted for the methylvinylsiloxane in the copolymer fluid of that example.

*Example 6*

Equivalent results are obtained when 100 parts by weight of a copolymer gum of 95 mol percent dimethylsiloxane and 5 mol percent diphenylsiloxane, 25 parts by weight of a copolymer fluid having a viscosity of 150 cs. at 25° C. and being composed of 6 mol percent ethylvinylsiloxane, 12 mol percent phenyldimethylsiloxane, 52 mol percent phenylmethylsiloxane and 30 mol percent dimethylsiloxane, 35 parts by weight of a silica aerogel and 2.5 parts by weight of benzoyl peroxide are milled together and vulcanized in accordance with the procedure of Example 1.

*Example 7*

Equivalent results are obtained when 30 parts by weight of a fluid having a viscosity of 600,000 cs. at 25° C. and having a composition 40 mol percent dimethylsiloxane, 50 mol percent phenylmethylsiloxane, 9.999 mol percent methylvinylsiloxane and .001 mol percent trimethylsiloxane is employed in the procedure of Example 1.

That which is claimed is:

1. A heat hardenable composition of matter comprising (1) 100 parts of weight of a diorganopolysiloxane gum in which the organic radicals are selected from the group consisting of monovalent hydrocarbon radicals and halogenated monovalent hydrocarbon radicals, (2) from 10 to 35 parts by weight of a copolymer fluid having a viscosity of less than 1,000,000 cs. at 25° C. and being composed of from 20 to 60 mol percent dimethylsiloxane, from 30 to 60 mol percent phenylmethylsiloxane, from 5 to 15 mol percent siloxane units of the formula $$R_n V_i SiO_{\frac{3-n}{2}}$$

in which $V_1$ is vinyl and in which R is of the group consisting of alkyl and phenyl radicals and $n$ has a value from 0 to 1 inclusive and from .0003 to 35 mol percent siloxane units of the formula $RMe_2SiO_{.5}$ in which Me is a methyl radical and in which R is of the group consisting of alkyl and phenyl radicals in which copolymer fluid at least some of the vinylsiloxane is copolymerized with the phenylmethylsiloxane and (3) a peroxide vulcanization agent.

2. A heat hardenable composition of matter comprising (1) 100 parts by weight of a diorganopolysiloxane gum in which the organic radicals are selected from the group consisting of monovalent hydrocarbon radicals and halogenated monovalent hydrocarbon radicals, (2) from 10 to 35 parts by weight of a copolymer fluid having a viscosity of less than 1,000,000 cs. at 25° C. and being composed of from 20 to 60 mol percent dimethylsiloxane, from 30 to 60 mol percent phenylmethylsiloxane, from 5 to 15 mol percent siloxane units of the formula $$R_n V_i SiO_{\frac{3-n}{2}}$$

in which Vi is vinyl and in which R is of the group consisting of alkyl and phenyl radicals and $n$ has a value from 0 to 1 inclusive and from .0003 to 35 mol percent siloxane units of the formula $RMe_2SiO_{.5}$ in which Me is a methyl radical and in which R is of the group consisting of alkyl and phenyl radicals in which copolymer fluid at least some of the vinylsiloxane is copolymerized with the phenylmethylsiloxane, (3) a peroxide vulcanization agent, and (4) a filler.

3. A heat hardenable composition of matter comprising (1) 100 parts by weight of a methylphenylpolysiloxane gum, (2) from 10 to 35 parts by weight of a copolymer fluid having a viscosity of less than 1,000,000 cs. at 25° C. being composed of from 20 to 60 mol percent dimethylsiloxane, from 30 to 60 mol percent phenylmethylsiloxane, from 5 to 15 mol percent methylvinylsiloxane, and from .0003 to 35 mol percent trimethylsiloxane in said copolymer fluid at least some of the methylvinylsiloxane being copolymerized with the phenylmethylsiloxane and (3) a peroxide vulcanizing agent.

4. A heat hardenable composition of matter comprising (1) 100 parts by weight of a methylphenylpolysiloxane gum, (2) from 10 to 35 parts by weight of a copolymer fluid having a viscosity of less than 1,000,000 cs. at 25° C. being composed of from 20 to 60 mol percent dimethylsiloxane, from 30 to 60 mol percent phenylmethylsiloxane, from 5 to 15 mol percent methylvinylsiloxane, and from .0003 to 35 mol percent trimethylsiloxane in said copolymer fluid at least some of the methylvinylsiloxane being copolymerized with the phenylmethylsiloxane, (3) a peroxide vulcanizing agent, and (4) a filler.

5. A vulcanized siloxane elastomer comprising (1) 100 parts by weight of a diorganopolysiloxane gum in which the organic radicals are selected from the group consisting of monovalent hydrocarbon radicals and halogenated monovalent hydrocarbon radicals and (2) from 10 to 35 parts by weight of a copolymer fluid of less than 1,000,000 cs. at 25° C. said fluid being composed of from 20 to 60 mol percent dimethylsiloxane, from 30 to 60 mol percent phenylmethylsiloxane, from 5 to 15 mol percent siloxane units of the formula $$R_n V_i SiO_{\frac{3-n}{2}}$$

in which Vi is vinyl and in which R is of the group consisting of methyl and phenyl radicals and $n$ has a value from 0 to 1 inclusive, and from .0003 to 35 mol percent siloxane units of the formula $RMe_2SiO_{.5}$ in which Me is a methyl radical and in which R is of the group consisting of methyl and phenyl radicals in which copolymer fluid at least some of the vinylsiloxane is copolymerized with the phenylmethylsiloxane and (3) a filler.

6. A vulcanized siloxane elastomer comprising (1) 100 parts by weight of a methylphenylpolysiloxane gum, (2) from 10 to 35 parts by weight of a copolymer fluid of less than 1,000,000 cs. at 25° C. being composed of from 20 to 60 mol percent dimethylsiloxane, from 30 to 60 mol percent phenylmethylsiloxane, from 5 to 15 mol percent methylvinylsiloxane and from .0003 to 35 mol percent trimethylsiloxane in said copolymer fluid at least some of the methylvinylsiloxane being copolymerized with the phenylmethylsiloxane and (3) a filler.

References Cited in the file of this patent

UNITED STATES PATENTS

| | | |
|---|---|---|
| 2,442,196 | Coggeshall | May 25, 1948 |
| 2,645,628 | Hurd | July 14, 1953 |
| 2,714,099 | Weyenberg | Jan. 11, 1954 |